United States Patent
Yanagishima

(10) Patent No.: US 7,696,707 B2
(45) Date of Patent: Apr. 13, 2010

(54) SEMICONDUCTOR INTEGRATED CIRCUIT DEVICE

(75) Inventor: Daiki Yanagishima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 265 days.

(21) Appl. No.: 11/994,526

(22) PCT Filed: Jun. 20, 2006

(86) PCT No.: PCT/JP2006/312330

§ 371 (c)(1),
(2), (4) Date: Jan. 3, 2008

(87) PCT Pub. No.: WO2007/004418

PCT Pub. Date: Jan. 11, 2007

(65) Prior Publication Data

US 2009/0079377 A1 Mar. 26, 2009

(30) Foreign Application Priority Data

Jul. 4, 2005 (JP) ............................. 2005-194693

(51) Int. Cl.
*H02H 7/09* (2006.01)
(52) U.S. Cl. ................................. 318/400.22; 318/459
(58) Field of Classification Search ............ 318/400.22, 318/459; 361/18, 56; 327/535, 108
See application file for complete search history.

(56) References Cited

U.S. PATENT DOCUMENTS

2005/0168264 A1* 8/2005 Fukami ...................... 327/535

FOREIGN PATENT DOCUMENTS

| JP | 07-274575 | 10/1995 |
|---|---|---|
| JP | 08-019284 | 1/1996 |
| JP | 2004-265931 | 9/2004 |

* cited by examiner

*Primary Examiner*—Karen Masih
(74) *Attorney, Agent, or Firm*—Fish & Richardson P.C.

(57) ABSTRACT

In a semiconductor integrated circuit device of the invention, a plurality of external terminals include: a first external terminal (VCC, U, V and W terminals in the FIGURE) receiving a higher voltage than the other external terminals; and a second external terminal (FG terminal in the FIGURE) arranged adjacent to the first external terminal as one of the other external terminals, the second external terminal feeding out, from one end of a transistor Q1, a control pulse signal corresponding to the turning on and off of the transistor Q1, and the second external terminal is connected to an overvoltage protection circuit (consisting of R1, R2, Q2 and AND) that masks a control signal for turning on and off the transistor Q1 so that, when a voltage at the second external terminal reaches a predetermined threshold, the transistor Q1 is kept off all the time. In this way, it is possible to prevent, without the need for an extra external terminal, breakdown in case of a short circuit between adjacent external terminals.

6 Claims, 1 Drawing Sheet

SEMICONDUCTOR INTEGRATED CIRCUIT DEVICE

TECHNICAL FIELD

The present invention relates to a semiconductor integrated circuit device, and more particularly to breakdown prevention in case of a short circuit between adjacent external terminals.

BACKGROUND ART

In a semiconductor integrated circuit device having a plurality of external terminals, when a short circuit occurs between adjacent external terminals due to various factors (e.g., adhesion of dirt and dust), the external terminals generally fail to function properly. In particular, in a high withstand voltage IC such as a motor driver IC, when an external terminal short-circuited to a high withstand voltage terminal (such as a power supply terminal) happens to have a low withstand voltage (e.g., when the external terminal serves as a logic-signal input/output terminal), an excessive current may flow through an internal component connected to the external terminal to cause breakdown or heating of the semiconductor integrated circuit device.

Conventionally, one solution to the above-described shirt circuit between terminals is to use a non-connected terminal as an external terminal adjacent to a high withstand terminal.

As another conventional technology related to the present invention, there is disclosed and proposed a so-called SiP (system in package) IC in which a plurality of circuit components constituting a plurality of circuits are optimally divided according to the levels of current, power dissipation, voltage, required withstand voltage and other factors, and, for each of the levels, the circuit components are integrated into individual semiconductor chips (for example, see patent document 1).

Patent document 1: JP-A-2004-265931

DISCLOSURE OF THE INVENTION

Problems to be Solved by the Invention

To be sure, if a non-connected terminal is used as an external terminal adjacent to a high withstand voltage terminal, in case of a short circuit between the external terminal and the high withstand voltage terminal, it is possible to prevent breakdown of an internal component and improper operation of a semiconductor integrated circuit device.

It is, however, difficult to adopt the conventional technology described above unless there are an ample number of external terminals. In a semiconductor integrated circuit device (such as a polygon mirror motor driver IC) required to minimize the number of external terminals in terms of reducing mounting space, it is highly undesirable to provide an extra external terminal, and this makes it difficult to adopt the conventional configuration described above.

An object of the present invention is to provide a semiconductor integrated circuit device that prevents, without the need for an extra external terminal, breakdown in case of a short circuit between adjacent external terminals.

Means for Solving the Problem

To achieve the above object, according to one aspect of the present invention, a semiconductor integrated circuit device includes a plurality of external terminals as means for electrical connection to an outside of the semiconductor integrated circuit device. Here, the above-mentioned the external terminals include: a first external terminal receiving a higher voltage than other external terminals; and a second external terminal arranged adjacent to the first external terminal as one of the other external terminals, the second external terminal feeding out, from one end of a transistor, a logic signal corresponding to turning on and off of the transistor, the second external terminal being connected to an overvoltage protection circuit masking a control signal for turning on and off the transistor so that, when a voltage at the second terminal reaches a predetermined threshold, the transistor is kept off (a first configuration).

In the semiconductor integrated circuit device of the first configuration, the first external terminal may be arranged at an end of a row of external terminals (a second configuration).

The semiconductor integrated circuit device of the first or second configuration may be a motor driving device for controlling driving of a motor, and the second external terminal may be an external terminal through which a control pulse signal corresponding to turning on and off of an N-channel field effect transistor is fed out from an open drain of the N-channel field effect transistor out of the semiconductor integrated circuit device (a third configuration).

The semiconductor integrated circuit of the third configuration may include, as the first external terminal, an external terminal for receiving electric power from a power line outside the semiconductor integrated circuit device and an external terminal through which a drive signal is fed out to motor coils for individual phases of the motor. Here, as the first external terminal, a plurality of external terminals are arranged adjacent to each other (a fourth configuration).

The semiconductor integrated circuit device of the third or fourth configuration may further include a driver generating the drive signal and an overcurrent protection circuit stopping the generation of the drive signal when a drive current flowing through the driver reaches a predetermined threshold (a fifth configuration).

In any one of the semiconductor integrated circuit devices of the third to fifth configurations, the overvoltage protection circuit may include: first and second resistors connected in series between the second external terminal and a ground line; an npn bipolar transistor having a collector thereof connected to a power line within the semiconductor integrated circuit device, having an emitter thereof connected to the ground line and having a base thereof connected to a node between the first and second resistors; and an AND circuit having one input terminal thereof connected to the collector of the npn bipolar transistor, having the other input terminal thereof connected to a signal source of the control pulse signal and having an output terminal thereof connected to a gate of the N-channel field effect transistor (a sixth configuration).

ADVANTAGES OF THE INVENTION

With a semiconductor integrated circuit of the present invention, it is possible to prevent, without the need for an extra external terminal, breakdown in case of a short circuit between adjacent external terminals.

LIST OF REFERENCE SYMBOLS

Figure 1:
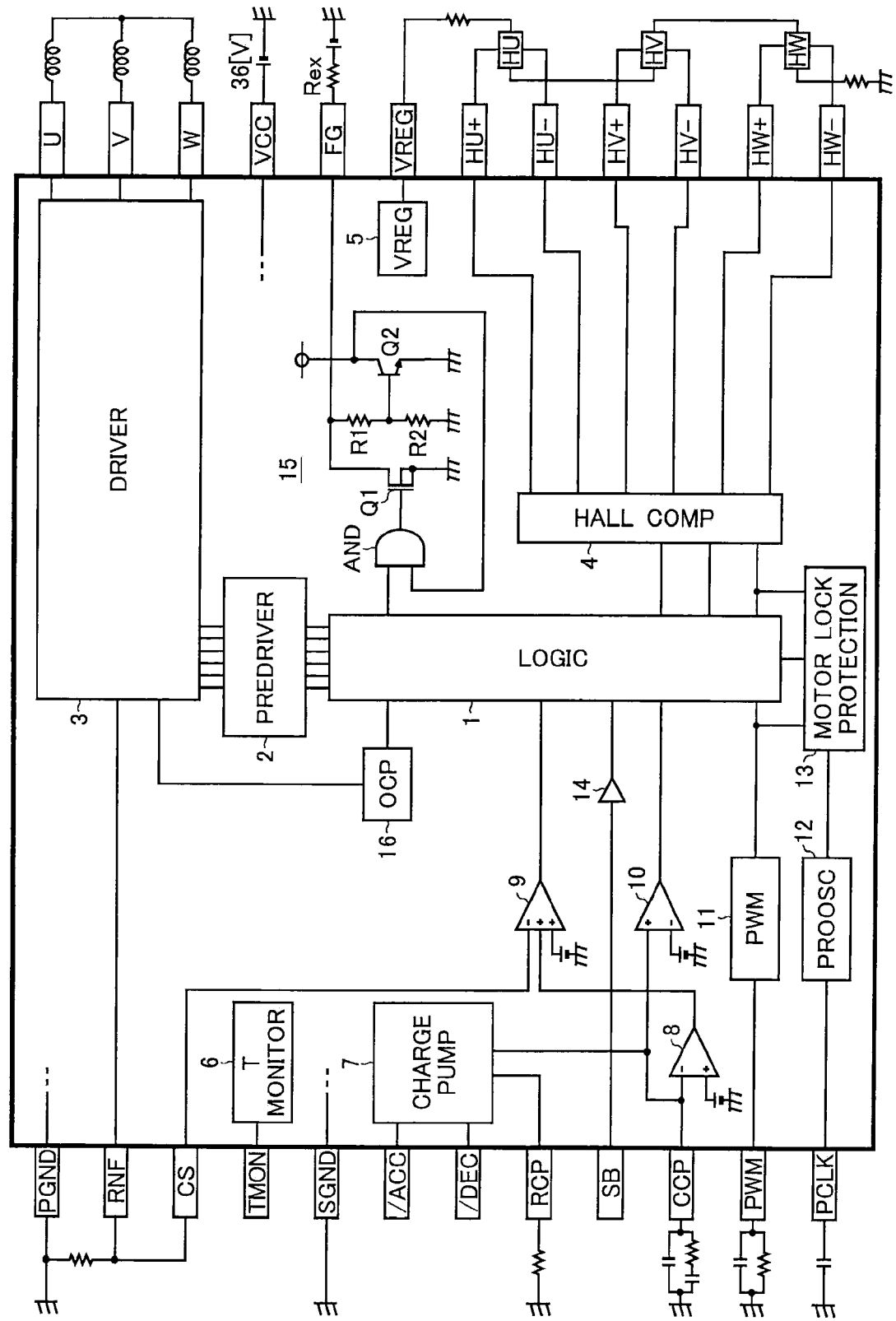
[FIG. 1] A diagram showing a semiconductor integrated circuit device as an embodiment of the present invention.

1 Logic circuit
2 Pre-driver
3 Driver
4 Hall comparator
5 Regulator
6 Temperature monitoring circuit
7 Charge pump
8 Torque amplifier
9 Comparator
10 Comparator
11 PWM signal generating circuit
12 Oscillation circuit
13 Motor lock protection circuit
14 Buffer
15 Control pulse signal output circuit
16 Overcurrent protection circuit
R1 and R2 Resistor
Q1 N-channel field effect transistor
Q2 Npn bipolar transistor
AND AND circuit

BEST MODE FOR CARRYING OUT THE INVENTION

Hereinafter, a description will be given of a case where the present invention is applied to a motor driver IC (such as, in particular, a polygon mirror motor driver IC required to minimize the number of external terminals) for controlling the driving of a motor.

FIG. 1 is a diagram showing a semiconductor integrated circuit device as an embodiment of the invention. As shown in FIG. 1, the semiconductor integrated circuit device of this embodiment has, as means for electrical connection to the outside of the device, 12 external terminals on each side of the package thereof, that is, a total of 24 external terminals (PGND, RNF, CS, TJMON, SGND, /ACC, /DEC, RCP, SB, CCP, PWM, PROCLK, HW−, HW+, HV−, HV+, HU−, HU+, VREG, FG, VCC, W, V and U). The semiconductor integrated circuit device of this embodiment includes, as its internal circuit blocks, a logic circuit 1, a pre-driver 2, a driver 3, a Hall comparator 4, a regulator 5, a temperature monitoring circuit 6, a charge pump 7, a torque amplifier 8, comparators 9 and 10, a PWM signal generating circuit 11, an oscillation circuit 12, a motor lock protection circuit 13, a buffer 14, a control pulse signal output circuit 15 and an overcurrent protection circuit 16.

The PGND terminal (pin 1) serves as an external terminal for connecting the ground terminal of a power-system circuit section (e.g., the pre-driver 2 and the driver 3) to a ground line outside the device.

The RNF terminal (pin 2) serves as an external terminal through which a drive current flowing through power transistors (unillustrated) of the driver 3 is passed to the ground line via an externally connected sense resistor (having a resistance of about several hundred milliohms).

The CS terminal (pin 3) severs as an external terminal for receiving the voltage across the sense resistor so that the drive current for the power transistors is detected.

The TJMON terminal (represented by TMON in FIG. 1, pin 4) serves as an external terminal through which a temperature monitor signal obtained in the temperature monitoring circuit 6 is fed out of the device.

The SGND terminal (pin 5) serves as an external terminal for connecting the ground terminal of a signal-system circuit section (e.g., the logic circuit 1) to the ground line outside the device.

The /ACC terminal (pin 6) and the /IDEC terminal (pin 7) serve as external terminals for receiving, from outside the device, output control signals for the charge pump 7 to achieve speed control in a servo system. The servo signals inputted to these external terminals are high-speed logic signals that meet the requirement for response on the order of several tens of to several hundred nanoseconds.

The RCP terminal (pin 8) servers as an external terminal for connecting an external resistor (means for setting an output current) to the charge pump 7.

The SB terminal (pin 9) serves as an external terminal for receiving, from outside the device, a logic signal with which to turn on and off a short brake. The short break serves as a brake mechanism that brings into a conducting state either the entire upper portion or the entire lower portion of the power transistors of the driver 3 so that the motor stops by use of self-generated power.

The CCP terminal (pin 10) serves as an external terminal for connecting a charge/discharge circuit (means for generating a torque control signal) outside the device to the output terminal of the charge pump 7.

The PWM (pulse width modulation) terminal (pin 11) serves as an external terminal for connecting an external resistor and an external capacitor (means for adjusting the waveform of a PWM signal) to the PWM signal generating circuit 11.

The PROCLK terminal (represented by PCLK in FIG. 1, pin 12) serves as an external terminal for connecting an external capacitor (means for setting the oscillation frequency) to the oscillation circuit 12.

The HU+ terminal (pin 18), HU− terminal (pin 17), HV+ terminal (pin 16), HV− terminal (pin 15), HW+ terminal (pin 14) and HW− terminal (pin 13) serve as external terminals for receiving Hall signals for individual phases from Hall elements HU, HV and HW for three phases outside the device, respectively.

The VREG terminal (pin 19) serves as an external terminal through which a constant voltage generated by a regulator circuit 5 is fed as a power supply voltage to the Hall elements for individual phases.

The FG terminal (pin 20) serves as an external terminal through which a control pulse signal (FG pulse signal) corresponding to the turning on and off of the N-channel field effect transistor Q1 of the control pulse signal generating circuit 15 is fed out of the device from the open drain of the N-channel field effect transistor Q1.

The VCC terminal (pin 21) serves as an external terminal for receiving electric power from a power line outside the device. Since a high voltage (e.g., 36 V at the maximum) is applied as an input voltage to the VCC terminal, it is designed to have a high withstand voltage.

The U, V and W terminals (pins 24, 23 and 22) serve as external terminals through which drive signals are fed to motor coils for three phases (U, V and W phases) of the motor, respectively. Since high voltages are applied as the drive signals to these external terminals, they are designed to have a high withstand voltage.

Of the external terminals described above, the VCC terminal and the U, V and W terminals each receive higher voltages than the other external terminals do. These terminals correspond to "a first external terminal" recited in the claims. The FG terminal, which feeds, as the external terminal adjacent to the VCC terminal, the control pulse signal corresponding to the turning on and off of the transistor Q1 from the open drain of the transistor Q1, corresponds to "a second external terminal" recited in claims.

As shown in FIG. 1, the first external terminal is arranged at the end (pins 21 to 24) of a row of external terminals and, where there are a plurality of first external terminals, they are arranged adjacent to each other. With this arrangement, it is possible to reduce the number of external terminals adjacent to the first external terminal, to which a high voltage is applied, thus minimizing the possibility of the short circuit described previously.

The logic circuit 1 serves as means for controlling the overall operations of the device (constant-speed drive control and phase control of the motor based on output signals for individual phases from the Hall comparator 4, constant-current drive control of the motor based on the output of the comparison by the comparator 9, torque control of the motor based on the output of the comparison by the comparator 10, control-pulse output control by use of the control pulse signal generating circuit 15, circuit protection control based on the output of the monitoring by the overcurrent protection circuit 16 and other circuit protection control). A description will now be given of the constant-speed drive control and phase control of the motor. The logic circuit 1 generates pre-drive signals (uh, ul, vh, vl, wh and wl) for individual phases of the motor while controlling the rotation speed and phase of the motor through feedback based on the output signals for individual phases from the Hall comparator 4, and feeds these pre-drive signals to the pre-driver 2.

The pre-driver 2 serves as means that shifts the level of and shapes the waveform of the pre-drive signals (uh, ul, vh, vl, wh and wl) fed from the logic circuit 1 to generate the drive signals (UH, UL, VH, VL, WH and WL) for the individual phases of the motor, and that feeds these signals to the driver 3.

The driver 3 serves as means for driving the motor with the power transistors (unillustrated) connected in an H-bridge configuration. The power transistors are turned on and off according to the drive signals (UH, UL, VH, VL, WH and WL) fed to their respective gates, and drives the motor externally connected to the U, V and W terminals.

The Hall comparator 4 serves as means that compares with each other sinusoidal Hall signals (+/−) for individual phases as fed in through the HU terminals (+/−), HV terminals (+/−) or HW terminals (+/−), that generates sinusoidal output signals for individual phases and that feeds these signals to the logic circuit 1.

The regulator 5 serves as means for voltage conversion; specifically, it generates the desired output voltage from the input voltage fed in through the VCC terminal and feeds out, through the VREG terminal, this desired output voltage as the power supply voltage to the Hall elements for individual phases.

The temperature monitoring circuit 6 serves as means that generates a temperature monitor signal according to the chip temperature of the semiconductor integrated circuit device, and feeds this signal out of the device through the TJMON terminal.

The charge pump 7 serves as means that generates an output current according to the servo signals fed in through the /ACC terminal and /DEC terminal, and passes this output current to the charge/discharge circuit externally connected to the CCP terminal. That is, at the CCP terminal, a torque control voltage (charge/discharge voltage) is obtained that varies with the output current of the charge pump 7.

The torque amplifier 8 serves as means that amplifies the difference between the torque control voltage obtained at the CCP terminal and a predetermined reference voltage, and outputs the amplified voltage.

The comparator 9 serves as means that compares the output voltage of the torque amplifier 8 or the predetermined reference voltage with the voltage across the sense resistor (a reference voltage commensurate with the drive current for the power transistors), which is fed in through the CS terminal, and feeds the comparison result to the logic circuit 1.

The comparator 10 serves as means that compares the torque control voltage obtained at the CCP terminal with the predetermined reference voltage, and feeds the comparison result to the logic circuit 1.

The PWM signal generating circuit 11 serves as means that generates the PWM signal corresponding to the external resistor and the external capacitor connected to the PWM terminal, and feeds this PWM signal to the logic circuit 1.

The oscillation circuit 12 serves as means that generates, based on the external capacitor connected to the PROCLK terminal, a clock signal having a predetermined oscillation frequency, and feeds this clock signal to the motor lock protection circuit 13.

The motor lock protection circuit 13 serves as means that detects whether the motor is locked, and, if the motor is found to be locked, instructs the logic circuit 1 to stop the motor.

The buffer 14 serves as means that buffers a logic signal fed through the SB terminal, and feeds the buffered signal to the logic circuit 1.

The control pulse signal generating circuit 15 is composed of: the N-channel field effect transistor Q1 serving as means for feeding the control pulse signal; and an overvoltage protection circuit (consisting of resistors R1 and R2, an npn bipolar transistor Q2 and an AND circuit AND) that turns the impedance at the FG terminal high when the FG terminal is short-circuited to the VCC terminal.

The drain of the transistor Q1 is connected to the FG terminal, and is also connected via the resistors R1 and R2 to the ground line (SGND terminal). The source and back gate of the transistor Q1 are connected to the ground line (SGND terminal). The gate of the transistor Q1 is connected to the output terminal of the AND circuit AND. The base of the transistor Q2 is connected to the node between the resistors R1 and R2. The emitter of the transistor Q2 is connected to the ground line (SGND terminal). The collector of the transistor Q2 is connected to a power supply line (one output terminal of the regulator circuit 5) included in the device, and is also connected to one input terminal of the AND circuit AND. The other input terminal of the AND circuit AND is connected to the control pulse signal output terminal of the logic circuit 1.

The transistor Q1 is designed to have a higher withstand voltage than normal so that it is prevented from breaking down in case the FG terminal is short-circuited to the VCC terminal. More specifically, although the transistor Q1 is generally designed to have a withstand voltage of about 7 V in consideration of the fact that the rated voltage of the FG terminal is about 5 V, the transistor Q1 of this embodiment is actually designed to have a withstand voltage of 36 V.

A description will now be given of the normal operation of the control pulse signal generating circuit 15 configured as described above. When the FG terminal and the VCC terminal are not short-circuited, a voltage of about 5 V is applied to the FG terminal via an external resistor Rex (having a resistance of about 10 kΩ). The resistors R1 and R2 are designed to have sufficiently higher resistances (of 950 kΩ and 50 kΩ, respectively, in this embodiment) than that of the external resistor Rex, and hence the divided voltage (about 0.25 V) appearing at the node between the resistors R1 and R2 is one twentieth of the voltage at the FG terminal.

The transistor Q2 turns on when a potential difference of about 0.6 to 0.7 V is applied between the base and emitter thereof, and turns off when a smaller potential difference is applied therebetween. Thus, when the FG terminal and the VCC terminal are not short-circuited, the transistor Q2 is off, and accordingly the voltage signal fed to one input terminal of the AND circuit AND is high. Consequently, the control pulse signal from the logic circuit 1 is fed to the gate of the transistor Q1 without being masked, and hence the control pulse signal generating circuit 15 generates (shifts the logic level of) the control pulse signal through the gate control (switching control) by the logic circuit 1 using the transistor Q1.

A description will now be given of the overvoltage protection operation of the control pulse signal generating circuit 15 configured as described above. When a short circuit occurs between the FG terminal and the VCC terminal, a high voltage of 36 V at the maximum is applied to the FG terminal from the power line outside the device.

Here, as described above, the transistor Q2 turns from off to on when a potential difference of about 0.6 to 0.7 V is applied between the base and emitter, that is, when the voltage at the FG terminal rises to 12 to 14 V. Thus, when the FG terminal and the VCC terminal are short-circuited, the transistor Q2 turns on, and accordingly the voltage signal applied to the one input terminal of the AND circuit AND becomes low. Consequently, the control pulse signal from the logic circuit 1 is masked by the AND circuit AND, and hence a low-level voltage signal is fed to the gate of the transistor Q1 all the time. In other words, the transistor Q1 is kept off by the overvoltage protection operation irrespective of the control pulse signal from the logic circuit 1.

With this configuration, while the FG terminal is short-circuited to the VCC terminal, since the transistor Q1 is not turned on, it is possible to prevent the breakdown of the transistor Q1 more reliably without relying solely on the withstand voltage that the transistor Q1 is designed to have. This helps achieve breakdown prevention without the need for an extra external terminal in case of a short circuit between the FC and VCC terminals. Moreover, with this configuration, it is possible to protect the transistor Q1 from short circuiting without giving it a higher withstand voltage. This helps prevent an increase in the size (the area occupied by the transistor Q1) of the device.

With the FG terminal and the VCC terminal short-circuited, a current flowing to the base of the transistor Q2 is limited by the resistors R1 and R2 so as not to become excessively high. Thus, the transistor Q2 is highly unlikely to break down.

With a bipolar transistor Q2 that serves as means for triggering overvoltage protection operation as in this embodiment, since it rapidly responds to overvoltage and has smaller production variations than a field effect transistor does, it is possible to achieve overvoltage protection with high speed and high precision. The present invention is, however, not limited to such a configuration, and any trigger means may be used.

The overcurrent protection circuit 16 serves as means that monitors the drive current flowing through the driver 3, and notifies, when the monitored current reaches a predetermined threshold, the logic circuit 1 of the monitored result to stop the operation (production of the drive signal) of the pre-driver 2 and the driver 3. With this overcurrent protection circuit 16, it is possible not only to achieve short circuit protection between the FG terminal and the VCC terminal, but also to prevent, even when a short circuit occurs between the high withstand voltage terminals (U and V terminals, V and W terminals or W and VCC terminals) and causes an excessive current to flow through the driver 3, the breakdown and heating of the semiconductor integrated circuit device by shutting down the operation without delay.

Although the embodiment described above deals with a case where the present invention is applied to a motor driver IC, the invention is not limited to such a configuration. The invention finds wide application in almost all semiconductor integrated circuits (such as regulator ICs) having a high withstand voltage terminal.

Although the embodiment described above deals with a case where the invention is applied to a semiconductor integrated circuit device having the same number of external terminals on each side of the package (that is, a dual inline package), the invention is not limited to such a configuration. The invention is naturally applied to a semiconductor integrated circuit device having external terminals on all four sides of the package.

Many modifications and variations are possible without departing from the spirit of the present invention.

Although the embodiment described above deals with a case where an FG terminal is arranged adjacent to a VCC terminal, the invention is not limited to such a configuration. For example, any external terminal may be arranged unless variations in characteristics (such as operation speed, input offset or input impedance) as produced by the insertion of the overvoltage protection circuit (consisting of R1, R2, Q2 and AND) disrupt the normal operation in the absence of a short circuit.

INDUSTRIAL APPLICABILITY

The technology of the present invention is useful in preventing breakdown in case of a short circuit between adjacent terminals, and is particularly suitable for a semiconductor integrated circuit device (such as a polygon mirror motor driver IC) required to minimize the number of external terminals.

The invention claimed is:

1. A semiconductor integrated circuit device comprising a plurality of external terminals for electrical connection to an outside of the semiconductor integrated circuit device,
    wherein the plurality of the external terminals include: a first external terminal to receive a higher voltage than other external terminals; and a second external terminal arranged adjacent to the first external terminal as one of the other external terminals, the second external terminal arranged to feed out, from one end of a transistor, a logic signal corresponding to turning on and off of the transistor, the second external terminal being connected to an overvoltage protection circuit to mask a control signal for turning on and off the transistor so that, when a voltage at the second terminal reaches a predetermined threshold, the transistor is kept off.

2. The semiconductor integrated circuit device of claim 1, wherein the first external terminal is arranged at an end of a row of external terminals.

3. The semiconductor integrated circuit device of claim 1 or 2, wherein the semiconductor integrated circuit device is a motor driving device for controlling driving of a motor, and the second external terminal is an external terminal through which a control pulse signal corresponding to turning on and off of an N-channel field effect transistor is fed out from an open drain of the N-channel field effect transistor out of the semiconductor integrated circuit device.

4. The semiconductor integrated circuit device of claim 3, further comprising, as the first external terminal, an external terminal for receiving electric power from a power line outside the semiconductor integrated circuit device and an external terminal through which a drive signal is fed out to motor coils for individual phases of the motor, wherein, as the first external terminal, a plurality of external terminals are arranged adjacent to each other.

5. The semiconductor integrated circuit device of claim 3, further comprising:

a driver to generate the drive signal; and an overcurrent protection circuit to stop the generation of the drive signal when a drive current flowing through the driver reaches a predetermined threshold.

6. The semiconductor integrated circuit device of claim 3, wherein the overvoltage protection circuit comprises:

first and second resistors connected in series between the second external terminal and a ground line;

an npn bipolar transistor having a collector thereof connected to a power line within the semiconductor integrated circuit device, having an emitter thereof connected to the ground line and having a base thereof connected to a node between the first and second resistors; and an AND circuit having one input terminal thereof connected to the collector of the npn bipolar transistor, having the other input terminal thereof connected to a signal source of the control pulse signal and having an output terminal thereof connected to a gate of the N-channel field effect transistor.

\* \* \* \* \*